Nov. 14, 1961 P. MacCORMACK 3,008,741
STRUCTURAL APPARATUS
Filed Dec. 12, 1958 2 Sheets-Sheet 1
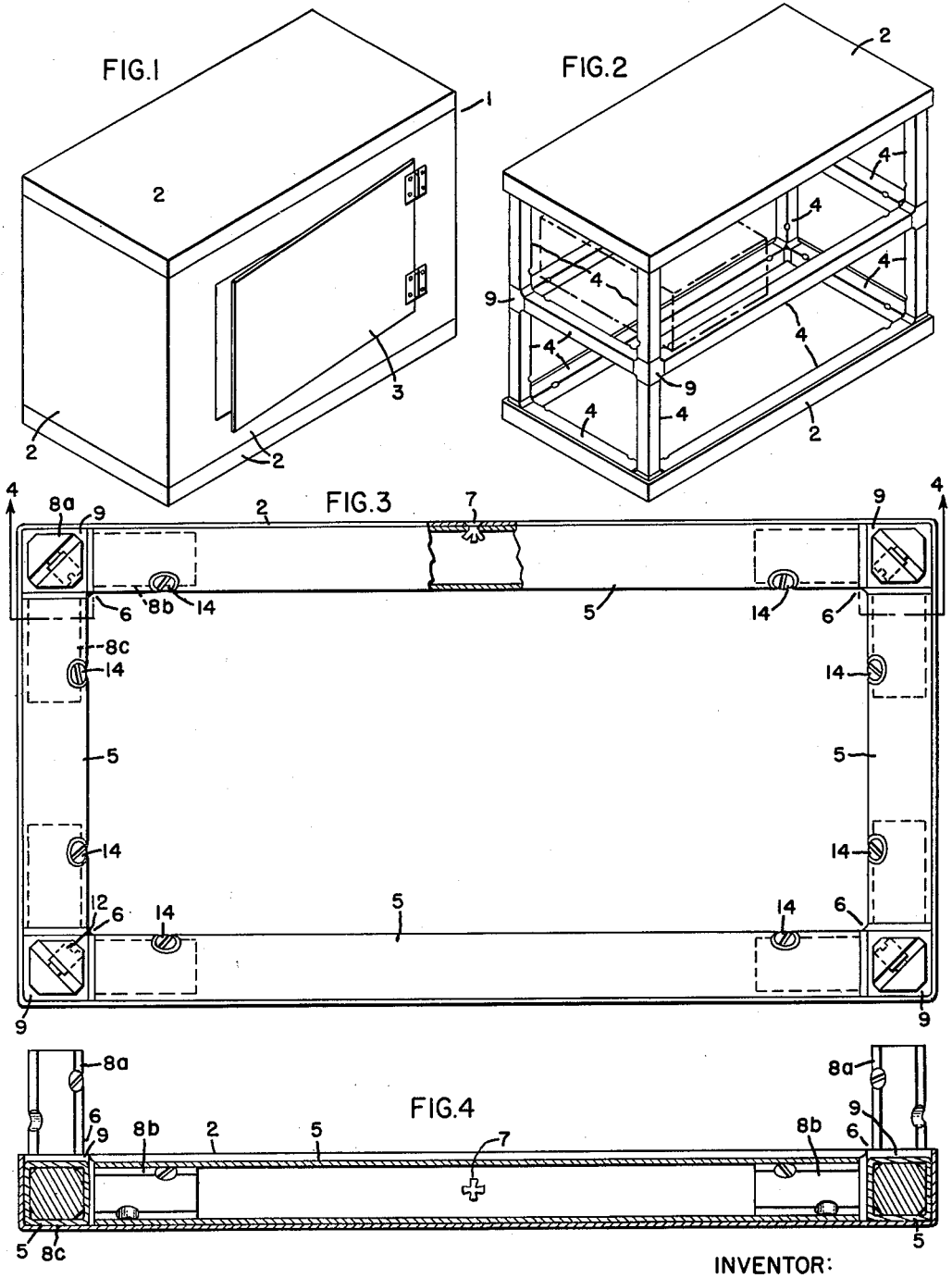
INVENTOR:
PAUL MacCORMACK,
BY *Michael Masnik*
HIS ATTORNEY.

Nov. 14, 1961 P. MacCORMACK 3,008,741
STRUCTURAL APPARATUS
Filed Dec. 12, 1958 2 Sheets-Sheet 2
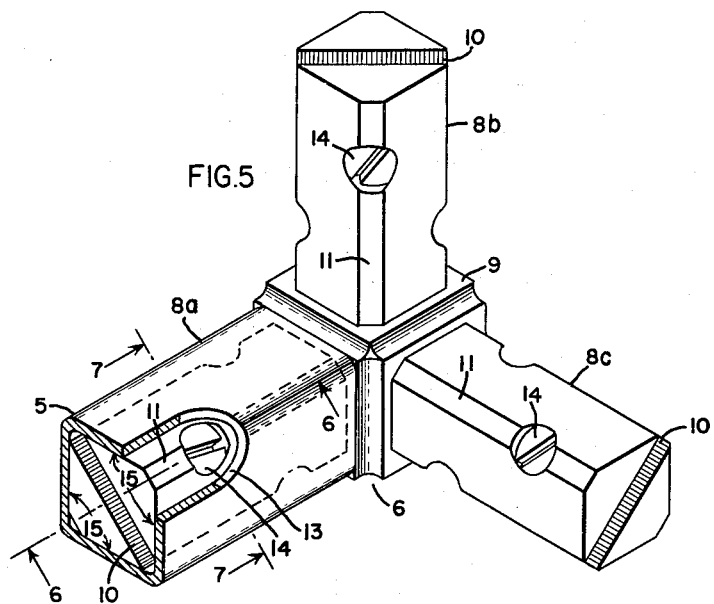
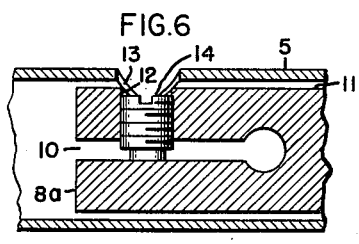
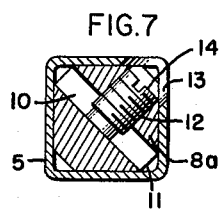
INVENTOR:
PAUL MacCORMACK,
BY *Michael Masnik*
HIS ATTORNEY.

United States Patent Office 3,008,741
Patented Nov. 14, 1961

3,008,741
STRUCTURAL APPARATUS
Paul MacCormack, Syracuse, N.Y., assignor to General Electric Company, a corporation of New York
Filed Dec. 12, 1958, Ser. No. 779,877
6 Claims. (Cl. 287—54)

This invention relates to the field of structural material, and more particularly to an improved means of assembling frames using tubular members.

In the field of structural material there has been a need for frameworks which are lightweight, rigid, and readily capable of various structural configurations, all to be provided at reasonable cost.

For example, in the field of electronics, lightweight metal frameworks are constantly required. Open frameworks constructed from tubular frame members have enjoyed increased popularity in recent years. These frames have an excellent strength-to-weight ratio and provide accessibility to components during both assembly and servicing. At present the tubular frame members are usually welded or brazed together where they intersect. This method of assembly has several disadvantages.

The heat of welding or brazing distorts the frame and even with the use of costly welding fixtures, laborious hand straightening is required on each frame. Drilling of holes for mounting of components, panels, etc., can only be done on the finished frame because of the welding and straightening operations. This entails the use of costly drill jigs which require careful placement and clamping in order to avoid additional distortions resulting in misalignment of holes.

In many cases heat treatment of the tubular members would improve the strength of the finished frame. However, this heat treatment is generally avoided because of the pronounced warping that results from the relieving of stresses accumulated as the result of the welding. Furthermore, the benefits of full heat treatment of the members before assembly are destroyed by the heat of welding.

A further problem in the manufacture of welded frame structures is that of cleaning and plating of the assembled frame, since welding precludes the use of prefinished frame members. Even with the use of pre-drilled weep holes and careful blowing out, it is extremely difficult to rid the interior of a frame of all the corrosive agents picked up in the plating process. The most distressing aspect of this fault is that it usually is not apparent until long after the equipment has been in operation.

A further problem in the construction of welded frames from tubular frame members arises in their use with electronic devices. In many cases a flush surface is required at each joint to accommodate electrical shielding and mounting fixtures. This requires careful grinding of the weld beads at each joint and consequent loss of strength at the joint.

Analogous problems exist in other than the electronics field and it is one object of my invention to provide an improved framework assembly which is free from such disadvantages.

Another object of this invention is to provide a means for construction of metal frameworks from pre-drilled, pre-finished tubular members.

Another object of this invention is to provide an improved structural framework.

Another object of this invention is to provide an improved structural framework capable of facilitating assembly of complex electrical equipment.

Another object of this invention is to provide an improved means of assembling together electrical components.

A further object of this invention is to provide improved joint-forming fittings for tubular frame construction.

Briefly, in accordance with one embodiment of this invention, there is provided a corner-forming fitting for connecting three square-shaped hollow frame members together. The frame members are provided with an open-ended tubular square cross-section and the fittings for connecting the frame members together comprise three insertable solid legs dimensioned for insertion within the tubing. Each of the legs is positioned at an angular relationship of 90 degrees with respect to the other of the legs and the legs are connected together by means of a solid member. Each of the legs is straightline slotted on one diagonal for a portion of its length with a stress relief radius at the bottom of the slot. A tapped hole is provided in each leg perpendicular to the slot on the other diagonal through one-half section of each leg. Each of the frame members is provided with a single opening across one diagonal in a position for mating with the tapped hole when the leg is inserted into its respective hollow frame member. A set screw is passed through the opening in the frame member for mating with the tapped hole such that upon screwing the set screw, the two slotted portions of each leg are forced apart sufficiently to engage the walls of the tubing in an internal friction-clamping action.

The features of my invention which I believe to be novel are set forth with particularity in the appended claims. My invention itself, however, both as to its organization and operation, together with further objects and advantages thereof, may best be understood by reference to the following description taken in connection with the accompanying drawings, in which:

FIG. 1 is an external view of a completed cabinet or box;

FIG. 2 is an exposed view of the cabinet supporting structure;

FIG. 3 is a cross-section of a cabinet construction illustrating the cooperation of supporting members located within the wall of the cabinet;

FIG. 4 is a cross-sectional view taken along the inner wall of the cabinet at 4—4 of FIG. 3;

FIG. 5 is a detail of the fitting;

FIG. 6 is a cross-sectional view taken along a diagonal of the fitting; and

FIG. 7 is an end view of the fitting within the tubing.

Referring to FIG. 1 of the drawings, there is shown a cabinet construction 1 formed of prefabricated wall portions, such as 2, and provided with a door 3 for gaining admittance to the interior of the cabinet which may contain various electronic components, assemblies, etc. In accordance with one embodiment of the present invention, the cabinet comprises supporting members, such as shown at 4 of FIG. 2, which serve several purposes—both in facilitating the assembly of the overall cabinet structure, as well as in providing the strength and rigidity for mounting and storing the electronic components and assemblies. In accordance with one embodiment of the invention, the wall portions, as for example the upper and bottom portions shown at 2 in FIG. 1, are prefabricated of a suitable structural material, preferably a conductive metal in the case where the structure is to house electrical components, and the supporting members 4 are prefabricated and adjustable to accommodate the dimensions established by the wall portions 2 and the other requirements of the cabinet structure. The supporting members comprise pre-cut square tubing which is fitted together in the desired structure by means of end fittings or corner fittings. The corner fittings are provided with a locking feature to hold the corner structure together while permitting some adjustment to nominal tolerances. Thus, in a structure such as that described, the supporting members are fitted within the prefabricated walls 2 to form the cabinet. In addition, they provide the strength and rigidity to the overall structure, as well as providing supporting members upon which the various electronic components can be mounted, in the form of shelves, drawers, doors, etc.

For a more detailed explanation of the present invention, reference is now made to FIG. 3 wherein the wall member 2, or dish pan, is shown. The square tubing 5, formed preferably of a conductive metal in the case where electronic components are involved, is positioned within the dish pan in abutting relation with the walls of the dish pan, and fittings 6 join the tubular square-tubing portions 5 into a rigid structure in a manner to be described shortly. In a preferred embodiment, the assembly of fitting 6 and square tubing 5 is positioned within the dish pan in the desired manner and the tubing 5 is riveted to the walls of the dish pan, as for example by means of self-clinching or internal-expansion rivets symbolically illustrated at 7. After the square tubing is rigidly fixed to the dish pan in the desired position, the fittings 6 are operated in a manner to internally clamp the tubings together by way of the fittings 6.

Referring to FIG. 4, there is shown in greater detail the positioning of the fittings and the square tubing within the dish pan 2 and the cooperation of the various components to provide the desired structure. FIG. 4 is a cross-sectional view taken along the direction 4—4 of FIG. 3. In FIG. 4 the fitting 6 is shown as comprising two leg portions 8a and 8b for insertion within the tubing 5. In the case of FIG. 4, each of the legs is positioned at an angular relationship of 90 degrees with respect to each other, and a solid member 9 is provided connecting the legs into a unitary structure 6. The manner in which the legs of the fitting 6 expand to clamp the inside walls of the tubing which are slid over the leg is shown in detail in FIG. 6 which is a cross-sectional view taken along the diagonal of the detailed drawing of the fitting in FIG. 5. In FIG. 6 the leg 8a is shown slotted on one diagonal for a portion of its length with a stress relief radius at the bottom of the slot 10. One slotted portion of the leg is provided with a tapped hole 12, perpendicular to the slot 10, on the other diagonal of the leg through one-half section of the leg. A single opening 13 is provided across one diagonal of the tubing in a position for mating with the tapped hole 12. A threaded set screw 14 mates with the tapped hole such that upon screwing the set screw through the aligned openings 12 and 13, the set screw forces the two slotted portions of each leg apart sufficiently to engage the walls of the tubing in an internal friction-clamping action.

Referring to FIG. 7, there is shown an end view of the fitting within the tubing and cabinet walls. It is seen that by screwing the threaded set screw 14 into the tapped hole 12 the two slotted portions of the leg 8a are forced apart causing a clamping force shown by the force vectors 15 of FIG. 5 to be applied to all four walls of the internal surface of 5 to provide the desired lock. Referring to FIG. 5, there is shown detail of one form of a three-leg fitting wherein the legs showing a three-corner fitting 6 comprising leg portions 8a, 8b and 8c, positioned 90 degrees with respect to one another, in two planes, and united by the solid member 9 into a unitary or integral structure. Since in practical cases the square tubing 5 has a corner radius, the leg portions 8a, 8b and 8c are provided with a chamfer such as that shown at 10 on the four corners thereof.

In one embodiment of the invention, 1¼" x ⅛" wall tubing, Alcoa No. 2024–T3 alloy, Alcoa Die No. 854, was used and end fittings fabricated of 2020T–4 aluminum with a ½"-20 set screw tightened to 35 lb./ft. of torque provided a rigid structure which withstood a pull of 1250 lb. While the invention has been described in terms of using fittings having 2 or 3 legs positioned apart at 90 degrees with respect to one another, it is obvious that any other number of legs can be provided at varying angles depending upon the nature of the cabinet requirements and the structure desired.

Furthermore, while the invention has been described in terms of using a single threaded set screw cooperating with a slotted leg, in certain applications, resort can be made to more than one set screw operating with the same slot by staggering the threaded set screw holes with respect to one another along the length of the leg and applying the set screw on opposite sides of the same diagonal.

Depending upon the requirements of the structure again, the leg of the fitting is dimensioned to provide a free fit into the tubing, which permits adjustment of the tube and leg within desired limits. This is important in the case of the structure illustrated in FIG. 1 wherein the supporting structure comprising the fittings and the square section tubing is mounted within a prefabricated dish pan.

While particular embodiments of the present invention have been shown and described, it will be obvious to those skilled in the art that changes and modifications may be made without departing from the invention in its broader aspects, and therefore the aim in the appended claims is to cover all such changes and modifications as fall within the true spirit and scope of the invention.

What I claim and desire to secure by Letters Patent of the United States is:

1. A fitting for connecting together a plurality of hollow, tubular frame members to form a corner structure wherein said members each have a square cross-section, said fitting comprising three solid legs having a square cross-section, said legs being joined at predetermined angles to one another and each adapted to be inserted into a respective one of said members, each of said legs being effectively slotted on one diagonal for a portion of its length, and screw means for forcing the two slotted portions of each leg apart sufficiently to engage the walls of the associated tubular frame member in an internal gripping action.

2. A tubular framework comprising three hollow frame members of a square cross-section, a corner forming fitting comprising three solid legs having a square cross-section, said legs being joined at ninety degrees to one another and each adapted to be inserted into a respective one of said members, each of said legs being effectively slotted on one diagonal for a portion of its length and having a tapped hole perpendicular to the slot on the other diagonal through one-half section of said leg, each of said members having an opening across one diagonal in a position for mating with the tapped hole, and a threaded set screw for mating with the tapped hole such that screwing the set screw forces the two effectively slotted portions of each leg apart sufficiently to engage the walls of the associated tubular frame member in an internal friction-gripping action.

3. A tubular framework comprising hollow frame members of square cross-section, a corner forming fitting having solid legs of square cross-section, said legs being joined at ninety degrees to one another, each of said legs being inserted into a respective one of said hollow members, each of said legs being effectively slotted on one diagonal for a portion of its length and having a tapped hole perpendicular to the slot on the other diagonal through one-half section of said leg, each of said members having an opening across one diagonal in a position for mating with the tapped hole, and a threaded set screw for mating with the tapped hole such that screwing the set screw forces the two slotted portions of each leg apart sufficiently to engage the walls of the associated tubular frame member in an internal gripping action to provide a rigid tubular framework.

4. A tubular framework comprising hollow frame members of square cross-section, a corner forming fitting having solid legs of square cross-section, said legs being joined at predetermined angles to one another, each of said legs being inserted into a respective one of said hollow members, each of said legs being effectively slotted on one diagonal for a portion of its length, and screw means for forcing the two slotted portions of each leg apart sufficiently to engage the walls of the associated tubular frame member in an internal gripping action to provide a rigid tubular framework.

5. A corner forming fitting for connecting together three hollow, tubular frame members wherein said frame members each have a tubular square cross-section, said fitting comprising three insertable solid legs dimensioned for insertion within respective ones of said members, a solid member fixedly connecting said legs at a ninety-degree angle to one another, each of said legs being straight-line slotted on one diagonal for a portion of its length with a stress relief radius at the bottom of the slot, and having a tapped hole perpendicular to the slot on the other diagonal through one-half section of said leg, each of said frame members having an opening across one diagonal in a position for mating with the tapped hole, and a threaded set screw for mating with the tapped hole such that screwing the set screw forces the two slotted portions of each leg apart sufficiently to engage the walls of the tubing in an internal friction-gripping action.

6. A fitting for connecting a plurality of hollow, tubular frame members of square cross-section to form a corner structure, said fitting comprising a plurality of solid legs of square cross-section, said legs being joined at 90 degrees to one another and adapted for insertion into respective ones of said hollow members, each of said legs being effectively slotted on one diagonal for a portion of its length and having a tapped hole perpendicular to the slot on the other diagonal to one-half section of said leg, a threaded set screw for mating with the tapped hole such that screwing the set screw forces the two effectively slotted portions of each leg apart sufficiently to engage the walls of the associated tubular frame member in an internal gripping action.

References Cited in the file of this patent

UNITED STATES PATENTS

| | | |
|---|---|---|
| 658,493 | Trigwell | Sept. 25, 1900 |
| 1,891,048 | Keefe | Dec. 13, 1932 |
| 2,063,895 | Mack | Dec. 15, 1936 |
| 2,198,964 | Goodyear | Apr. 30, 1940 |
| 2,546,187 | Harward | Mar. 27, 1951 |
| 2,645,509 | Valenta | July 14, 1953 |
| 2,657,944 | Miller | Nov. 3, 1953 |
| 2,817,547 | Canepa | Dec. 24, 1957 |

FOREIGN PATENTS

| | | |
|---|---|---|
| 594,187 | Great Britain | Nov. 5, 1947 |
| 972,215 | France | Jan. 26, 1951 |